(12) United States Patent
Menaskanian

(10) Patent No.: US 10,181,771 B2
(45) Date of Patent: Jan. 15, 2019

(54) WIND TURBINE PANEL

(71) Applicant: Valod Menaskanian, La Crescenta, CA (US)

(72) Inventor: Valod Menaskanian, La Crescenta, CA (US)

( * ) Notice: Subject to any disclaimer, the term of this patent is extended or adjusted under 35 U.S.C. 154(b) by 0 days.

(21) Appl. No.: 15/480,191

(22) Filed: Apr. 5, 2017

(65) Prior Publication Data

US 2017/0298907 A1    Oct. 19, 2017

Related U.S. Application Data

(60) Provisional application No. 62/322,692, filed on Apr. 14, 2016.

(51) Int. Cl.

| | | |
|---|---|---|
| *H02K 7/18* | (2006.01) | |
| *H02K 53/00* | (2006.01) | |
| *H02K 16/00* | (2006.01) | |
| *F03D 9/32* | (2016.01) | |
| *F03D 3/02* | (2006.01) | |
| *F03D 9/45* | (2016.01) | |
| *F03D 9/43* | (2016.01) | |
| *B60L 8/00* | (2006.01) | |
| *B60L 11/18* | (2006.01) | |
| *F25B 39/00* | (2006.01) | |
| *F25B 39/04* | (2006.01) | |

(52) U.S. Cl.
CPC ............. *H02K 7/183* (2013.01); *B60L 8/006* (2013.01); *B60L 11/1809* (2013.01); *F03D 3/02* (2013.01); *F03D 9/32* (2016.05); *F03D 9/43* (2016.05); *F03D 9/45* (2016.05); *F25B 39/00* (2013.01); *H02K 7/1823* (2013.01); *H02K 16/00* (2013.01); *H02K 53/00* (2013.01); *B60L 2210/30* (2013.01); *F05B 2220/7064* (2013.01); *F05B 2240/2212* (2013.01); *F25B 39/04* (2013.01)

(58) Field of Classification Search
CPC ............ H02K 7/183; F03D 9/32; B60L 8/006
USPC .......................................................... 290/55
See application file for complete search history.

(56) References Cited

U.S. PATENT DOCUMENTS

| | | | | |
|---|---|---|---|---|
| 1,717,552 A | * | 6/1929 | Dunn ..................... | B64D 27/00 180/2.2 |
| 3,713,503 A | * | 1/1973 | Haan ...................... | B60K 16/00 180/2.2 |
| 4,002,218 A | * | 1/1977 | Horvat .................. | B60K 16/00 180/2.2 |
| 4,141,425 A | * | 2/1979 | Treat ..................... | B60K 16/00 136/291 |

(Continued)

*Primary Examiner* — Julio Gonzalez
*Assistant Examiner* — Charles Reid, Jr.
(74) *Attorney, Agent, or Firm* — Plager Schack LLP

(57) ABSTRACT

A wind turbine panel is configured to distribute electricity to a load. The wind turbine panel includes a frame further includes a first slot having a first slot first end and a first slot second end. A first alternator is located in a first panel mount on the first slot first end. A second alternator is located in a second panel mount on the first slot second end. A first alternator shaft, connects the first alternator and the second alternator. A wind turbine is connected to the first alternator shaft. The load is electrically coupled to the first alternator and the second alternator. Wind traveling through the frame rotates the wind turbine and thus turns the alternator shafts that generates the electricity which is transferred to the load for use in downstream applications.

3 Claims, 5 Drawing Sheets

(56) References Cited

U.S. PATENT DOCUMENTS

| | | | | |
|---|---|---|---|---|
| 4,220,870 A * | 9/1980 | Kelly | | F03D 13/20 |
| | | | | 290/44 |
| 5,296,746 A | 3/1994 | Burkhardt | | |
| 5,986,429 A * | 11/1999 | Mula, Jr. | | F03D 9/25 |
| | | | | 180/165 |
| 6,897,575 B1 | 5/2005 | Yu | | |
| 6,981,839 B2 * | 1/2006 | Fan | | F03D 3/002 |
| | | | | 415/4.1 |
| 7,098,553 B2 * | 8/2006 | Wiegel | | F03D 3/002 |
| | | | | 290/44 |
| 7,135,786 B1 | 11/2006 | Deets | | |
| 7,808,121 B1 * | 10/2010 | Glynn | | F03D 13/20 |
| | | | | 290/1 R |
| 7,849,596 B2 * | 12/2010 | Sauer | | B23P 15/006 |
| | | | | 29/889.7 |
| 8,410,628 B1 * | 4/2013 | Suaya | | F03D 3/002 |
| | | | | 290/44 |
| 8,513,828 B1 | 8/2013 | Ripley | | |
| 8,564,148 B1 * | 10/2013 | Novak | | H02K 7/183 |
| | | | | 290/44 |
| 9,059,601 B2 * | 6/2015 | Rogers | | H02J 7/1415 |
| 2003/0209370 A1 | 11/2003 | Maberry | | |
| 2008/0150288 A1 * | 6/2008 | Fein | | B82Y 15/00 |
| | | | | 290/55 |
| 2010/0270808 A1 * | 10/2010 | Bates | | F03D 3/005 |
| | | | | 290/55 |
| 2011/0121578 A1 * | 5/2011 | Ferguson | | F03D 3/002 |
| | | | | 290/55 |
| 2011/0260470 A1 * | 10/2011 | Ahmadi | | B60L 8/00 |
| | | | | 290/1 R |
| 2012/0146338 A1 * | 6/2012 | Teglia | | H02K 7/183 |
| | | | | 290/55 |
| 2015/0244220 A1 | 8/2015 | Yost | | |
| 2015/0345473 A1 * | 12/2015 | Bardia | | F03D 3/005 |
| | | | | 290/44 |
| 2016/0311331 A1 * | 10/2016 | Guthrie | | B60L 11/1809 |

* cited by examiner

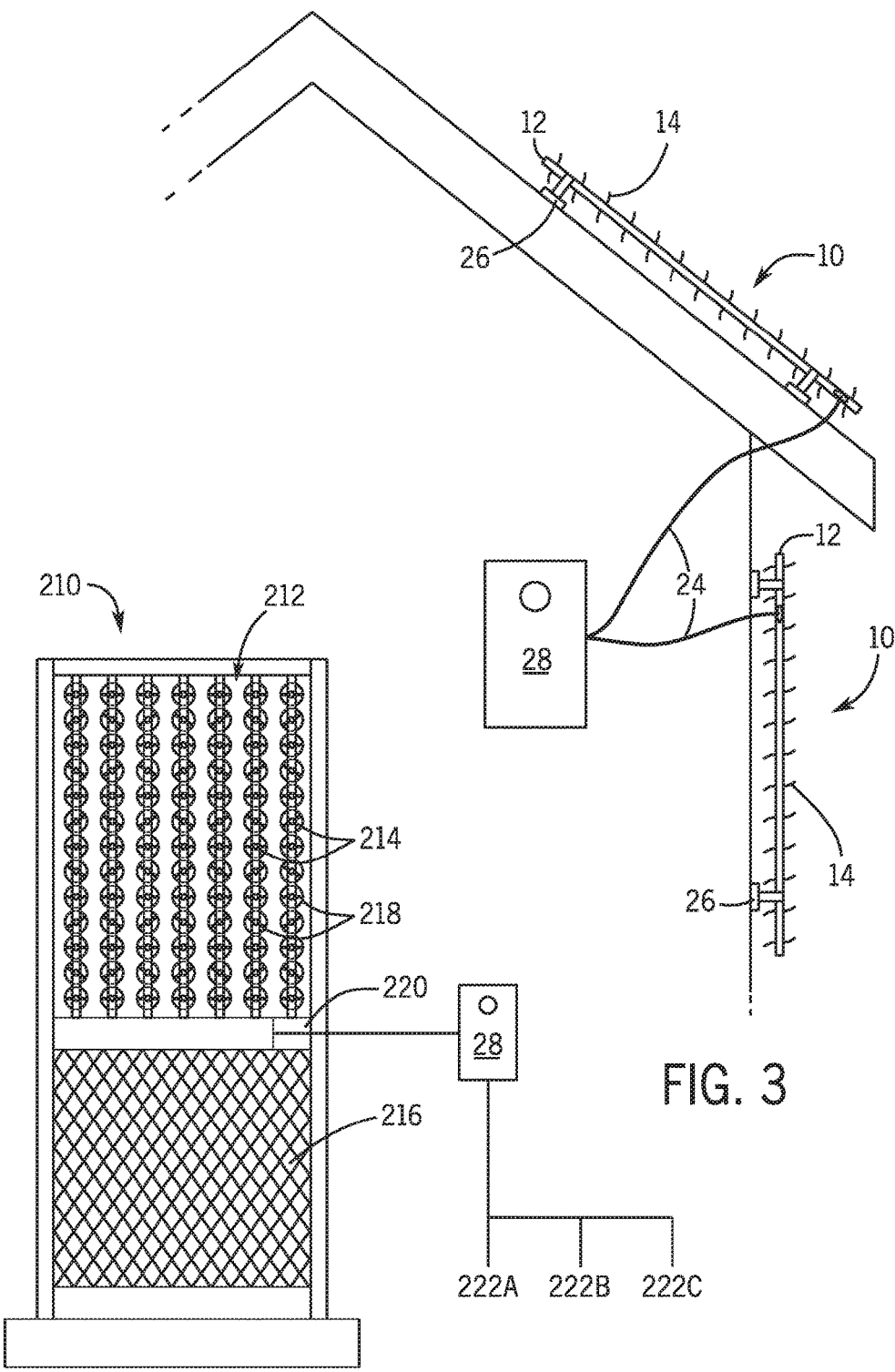

WIND TURBINE PANEL

RELATED APPLICATION

This application claims priority to provisional patent application U.S. Ser. No. 62/322,692 filed on Apr. 14, 2016, the entire contents of which is herein incorporated by reference.

BACKGROUND

The embodiments herein relate generally to a panel with wind turbines for generating electricity using a renewable energy source.

Energy needs across the world are growing at unprecedented rates. Alternative energy sources to fulfill those needs are required to have a sustainable future. Solar power has been the main source for both large scale and private alternative energy generation. Wind energy generation devices haven't been utilized in the same fashion as solar. Prior to embodiments of the disclosed invention, wind energy generating devices weren't practical or even legal in some populated/suburban areas due to the size or design of those devices. The uncertainty of wind direction and higher wind speed requirements of prior wind generating devices also made them impractical in heavily populated areas. Embodiments of the disclosed invention solve these problems.

SUMMARY

A wind turbine panel is configured to distribute electricity to a load. The wind turbine panel includes a frame further comprising a first slot having a first slot first end and a first slot second end. A first alternator is located in a first alternator mount on the first slot first end. A second alternator is located in a second alternator mount on the first slot second end. A wind turbine is connected to the first alternator and the second alternator via a first alternator shaft and a second alternator shaft, respectively. The first alternator and the second alternator are electrically coupled to an electrical outlet point on the frame. Wind traveling through the frame rotates the wind turbine, rotating the alternator shafts attached to the wind turbine which impels the alternators to generate electricity which is then transferred to an electrical outlet point and further to an electrical panel for use in a plurality of downstream applications.

In some embodiments, a third alternator is located in a third alternator mount on the first slot first end. A fourth alternator is located in a fourth alternator mount on the first slot second end. A second wind turbine connects to the third alternator and the fourth alternator via a third alternator shaft and a fourth alternator shaft, respectively. The first wind turbine and the second wind turbine are parallel to each other. The electrical outlet point is electrically coupled to the third alternator and the fourth alternator.

In some embodiments, a second slot is arranged in the frame parallel to the first slot and has a second slot first end and a second slot second end. A fifth alternator is located in a fifth alternator mount on the second slot first end. A sixth alternator is located in a sixth alternator mount on the second slot second end. A third wind turbine connects to the fifth alternator shaft and the sixth alternator shaft. The fifth alternator shaft and sixth alternator are parallel to the first alternator shaft and the second alternator shaft. The fifth alternator and the sixth alternator are electrically coupled to the electrical outlet point. In some embodiments, the fifth alternator shaft and sixth alternator shaft are collinear with the first alternator shaft and second alternator shaft. In other embodiments, the fifth alternator shaft and the sixth alternator shaft are parallel to but not collinear with the first alternator shaft and second alternator shaft.

In some embodiments, the frame can be attached to a hood or under a carriage of an electric vehicle. Alternately, the frame can be attached to a freeway wall, a freeway center divider, a subway tunnel, a roof of a home, a wall or an air conditioner condenser.

BRIEF DESCRIPTION OF THE FIGURES

The detailed description of some embodiments of the invention is made below with reference to the accompanying figures, wherein like numerals represent corresponding parts of the figures.

FIG. 3 is a schematic view showing the wind panel constructed of an embodiment of the invention.

FIG. 4 is a side elevation view of an installation of an embodiment of the invention.

DETAILED DESCRIPTION OF CERTAIN EMBODIMENTS

Figure 1:
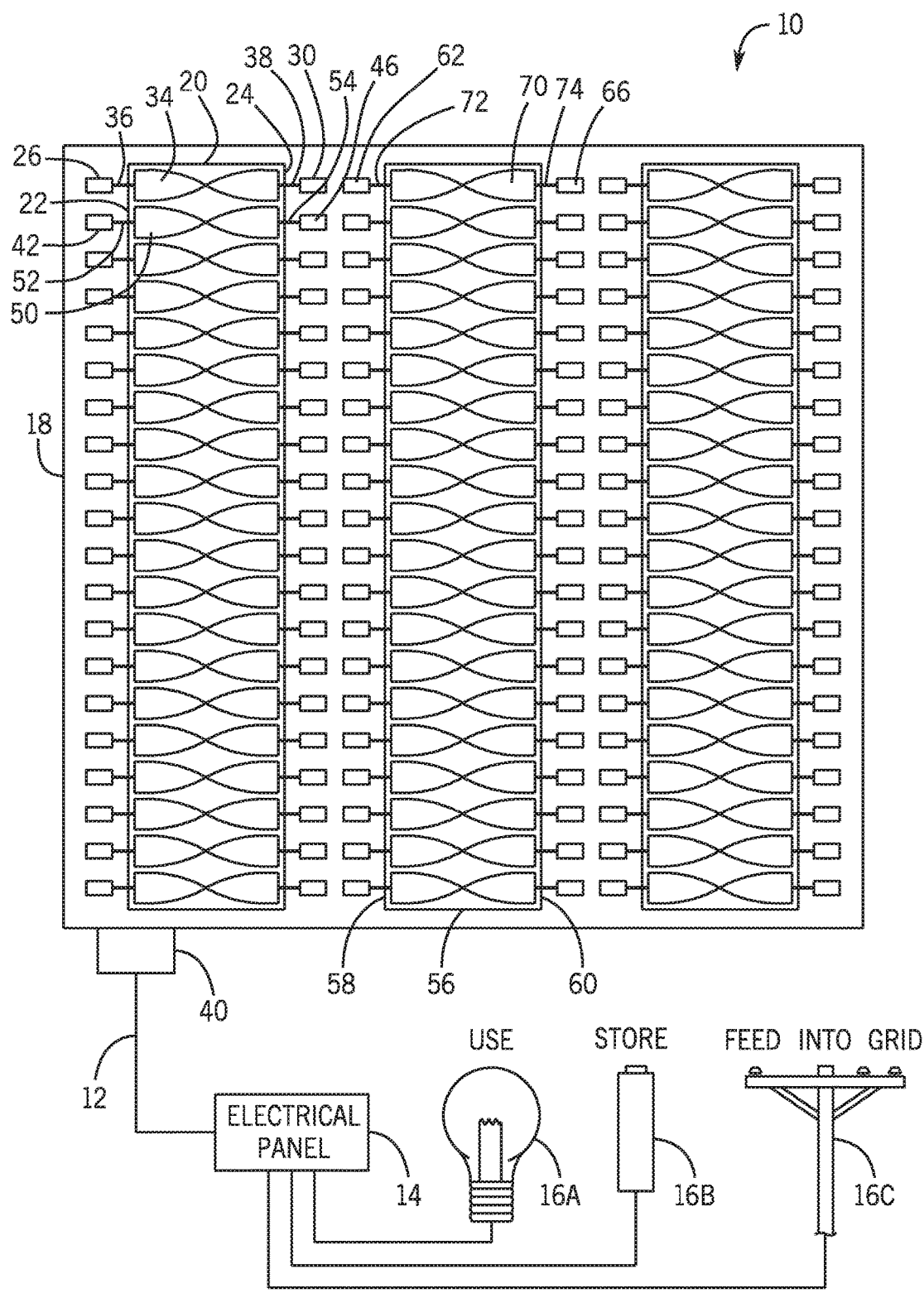
FIG. 1 is a front elevation view of an embodiment of the invention.
Figure 2:
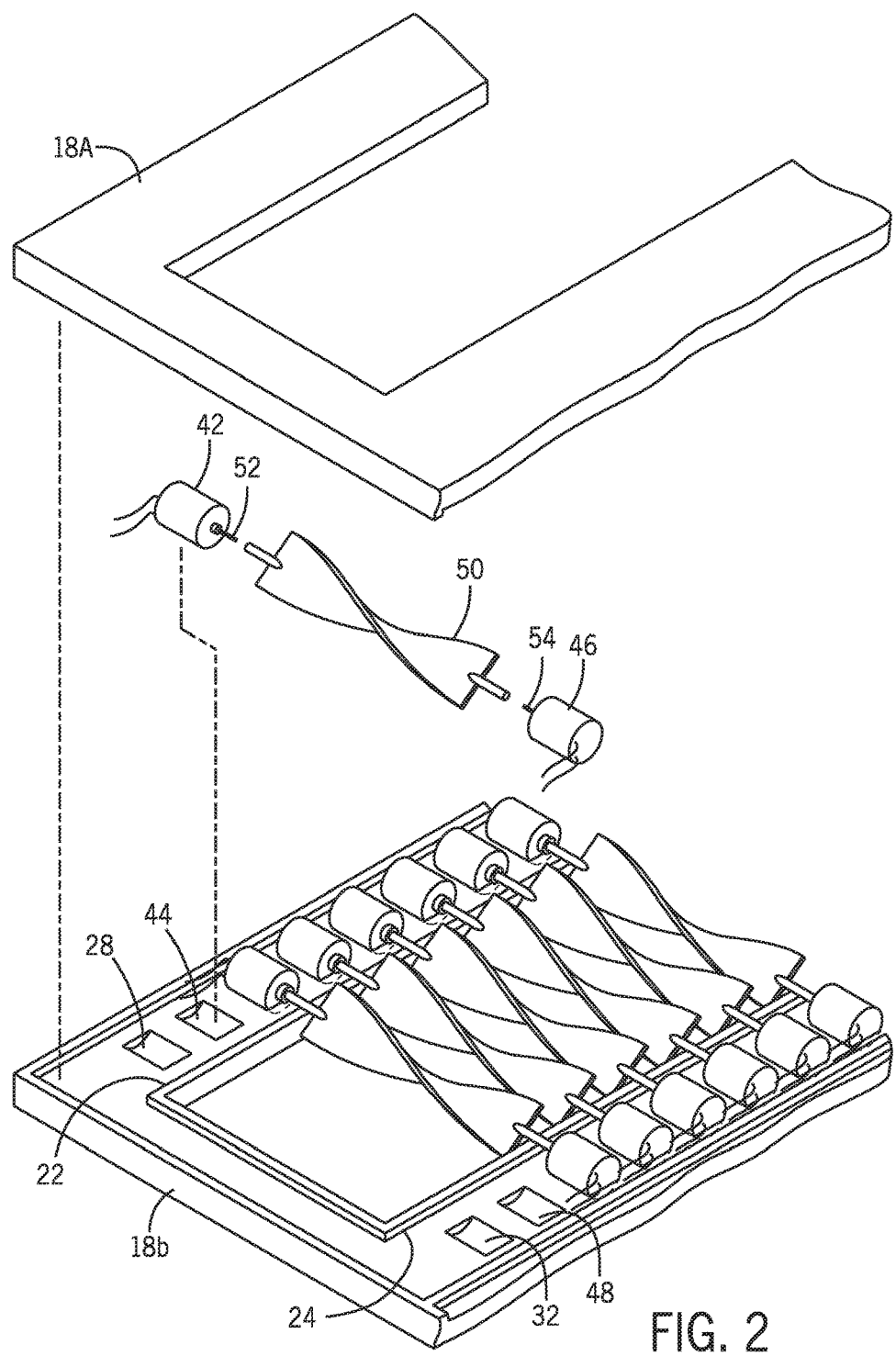
FIG. 2 is a detail deconstructed elevation view of an embodiment of the invention.
Figure 5:
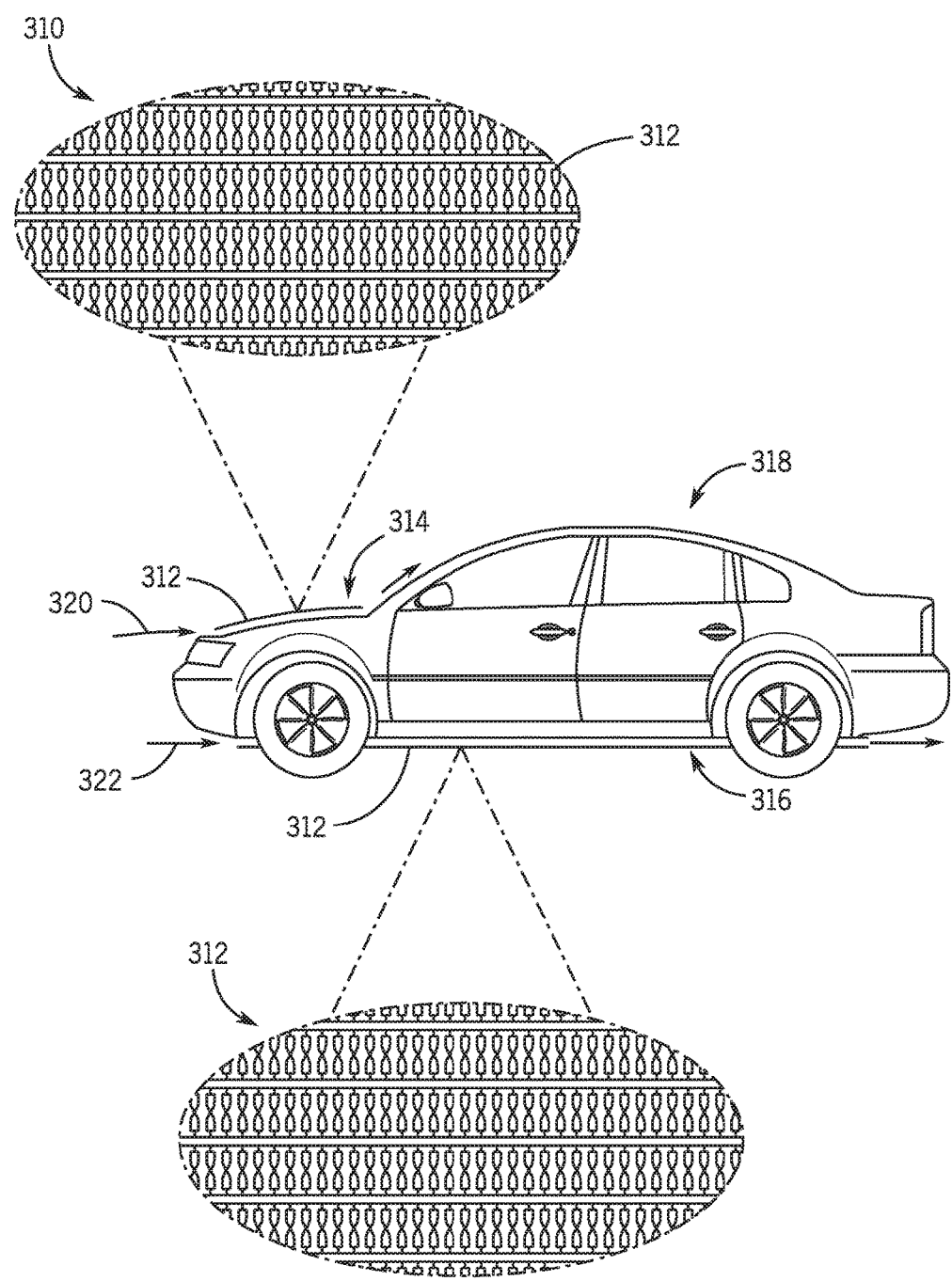
FIG. 5 is a schematic exploded side elevation view of an embodiment of the invention.
Figure 6:
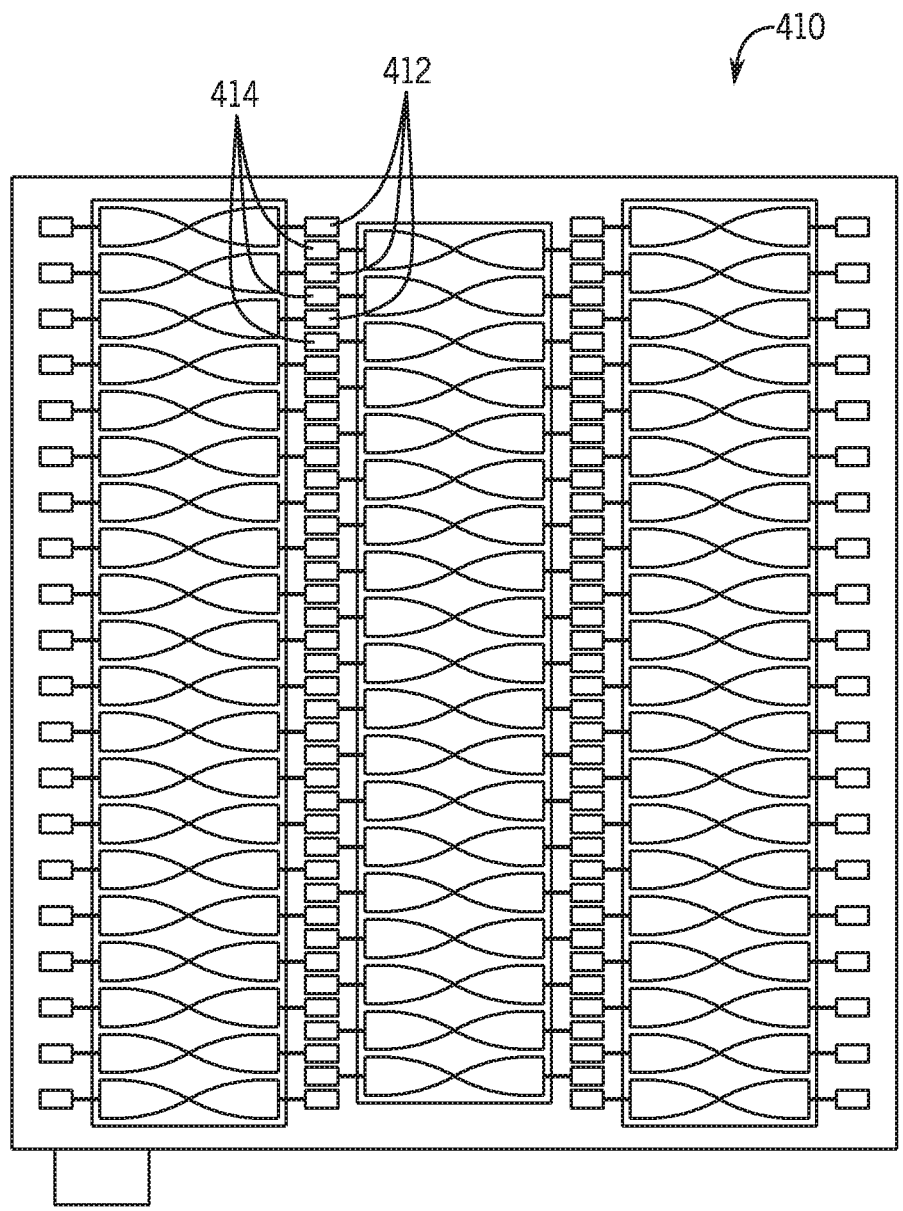
FIG. 6 is a schematic view of an embodiment of the invention.

By way of example, and referring to FIGS. 1-6, one embodiment of a wind turbine panel 10 is configured to distribute electricity via an electrical wire 12 to an electrical panel 14 for use in a plurality of downstream applications 16, such as powering devices 16A, storing electricity 16B and feeding into grid 16C. An AC/DC converter might be needed for storing electricity. The wind turbine panel includes a frame 18 further comprising a first slot 20 having a first slot first end 22 and a first slot second end 24. A first alternator 26 is located in a first alternator mount 28 on the first slot first end. A second alternator 30 is located in a second alternator mount 32 on the first slot second end. A first wind turbine 34 connects the first alternator and the second alternator via a first alternator shaft 36 and a second alternator shaft 38, respectively. An electrical outlet point 40 is electrically coupled to the first alternator and the second alternator. Wind traveling through the frame rotates the first wind turbine and thus turns the first alternator shaft and second alternator shaft impelling the first alternator and the second alternator to generate electricity, that is then transferred to the electrical outlet point, then to the electrical panel for use in a plurality of downstream applications 16, such as 16A, 16B and 16C.

In some embodiments, a third alternator 42 is located in a third alternator mount 44 on the first slot first end, adjacent to the first alternator. A fourth alternator 46 is located in a fourth alternator mount 48 on the first slot second end. A second wind turbine 50 connects the third alternator and the fourth alternator via a third alternator shaft 52 and a fourth alternator shaft 54, respectively. The second wind turbine is arranged on a parallel axis to the first wind turbine. The third alternator and the fourth alternator are coupled to the electrical outlet point. In some embodiments, the frame can be made from upper frame 18A and lower frame 18B.

In some embodiments, a second slot 52 is arranged in the frame 16 vertically parallel to the first slot 18 and has a second slot first end 54 and a second slot second end 56. A fifth alternator is located in a fifth panel mount 64 on the second slot first end 54. A sixth alternator 66 is located in a sixth panel mount 68 on the second slot second end 56. A third alternator shaft 66 connects the fifth alternator 58 and the sixth alternator 62. The third alternator shaft 66 is parallel to the first alternator shaft 34 and the second alternator shaft 46. The load 14A, 14B, 14C is electrically coupled to the fifth alternator 58 and the sixth alternator 62. In some embodiments, the third alternator shaft 66 is collinear with the first alternator shaft 34. In other embodiments, the third alternator shaft 466 is parallel to but not collinear with the first alternator shaft 434.

In a second embodiment 210, a plurality of wind turbine panels 212 having a plurality of wind turbines 214 is attached atop an air conditioner condenser 216. When the air conditioner condenser rotates the wind turbines, by forcing air through the wind turbines, and impels a plurality of alternators 218 to generate electricity that is further transferred to an electrical outlet point 220 and further to the electrical panel to be used in a plurality of downstream applications 222, such as powering devices 222A, storing electricity 222B and feeding into grid 222C.

In a third embodiment 310, a wind turbine panel 312 is attached to a hood 314 and under a carriage 316 of an electric vehicle 318 for respectively using a first air passageway 320 and a second air passageway 322 in order to generate electricity. An AC/DC converter might be used to recharge the electric vehicle's rechargeable batteries with electricity generated by the wind turbine panels. The first air passageway is airflow from front to rear of the vehicle, passing over the hood while the second air passageway is airflow from front to rear of the under the carriage.

In a fourth embodiment 410, a plurality of alternators connected to first slot 412 are alternately nested within a plurality of alternators connected to second slot 414. In this configuration, the alternators connected to first slot are not collinear with the alternators connected to second slot. This configuration saves space by placing the alternators from the first and the second slots alternately, rather than next to each other with space in between.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A wind turbine panel sheet, configured to distribute electricity to a car battery, the wind turbine panel sheet comprising:
   a first frame further comprising a first frame first slot having a first frame first slot first end and a first frame first slot second end;
      a first frame first alternator located in a first frame first panel mount on the first frame first slot first end;
      a first frame second alternator located in a first frame second panel mount on the first frame first slot second end;
      a first frame second alternator shaft, connecting the first frame first alternator and the first frame second alternator;
      a first frame wind turbine, connected to the first frame first alternator shaft;
      a second frame, arranged parallel to the first frame further comprising a second frame first slot having a second frame first slot first end and a second frame first slot second end;
   a second frame, arranged parallel to the first frame further comprising a second frame first slot having a second frame first slot first end and a second frame first slot second end;
      a second frame first alternator located in a second frame first panel mount on the second frame first slot first end;
      a second frame second alternator located in a second frame second panel mount on the second frame first slot second end;
      a second frame second alternator shaft, connecting the second frame first alternator and the second frame second alternator;
      a second frame wind turbine, connected to the second frame first alternator shaft;
   a third frame, arranged parallel to the first frame and further comprising a third frame first slot having a third frame first slot first end and a third frame first slot second end;
      a third frame first alternator located in a third frame first panel mount on the third frame first slot first end;
      a third frame second alternator located in a third frame second panel mount on the third frame first slot second end;
      a third frame second alternator shaft, connecting the third frame first alternator and the third frame second alternator;

a third frame wind turbine, connected to the third frame first alternator shaft;

the car battery, electrically coupled to the first frame first alternator, the first frame second alternator, the second frame first alternator, the second frame second alternator, the third frame first alternator, the third frame second alternator, wherein wind, traveling along a car hood through the first frame rotates the wind turbine and thus turns the alternator shafts that generates the electricity which is transferred to the car battery.

2. The wind turbine panel sheet of claim 1, further comprising:

a third alternator located in a third panel mount on the first frame first slot first end;

a fourth alternator located in a fourth panel mount on the first frame first slot second end;

a second alternator shaft, connecting the third alternator and the fourth alternator; wherein the second alternator shaft is parallel to but not collinear with the first alternator shaft;

wherein the load is electrically coupled to the third alternator and the fourth alternator.

3. The wind turbine panel sheet of claim 2, further comprising:

a fifth alternator located in a fifth panel mount on the first frame second slot first end;

a sixth alternator located in a sixth panel mount on the first frame second slot second end;

a third alternator shaft, connecting the fifth alternator and the sixth alternator; wherein the third alternator shaft is parallel to the first alternator shaft and the second alternator shaft;

wherein the load is electrically coupled to the fifth alternator and the sixth alternator.

* * * * *